United States Patent
Wu et al.

(10) Patent No.: US 11,977,747 B2
(45) Date of Patent: May 7, 2024

(54) MEMORY ACCESS APPARATUS AND METHOD HAVING ADDRESS SCRAMBLING MECHANISM

(71) Applicant: REALTEK SEMICONDUCTOR CORPORATION, Hsinchu (TW)

(72) Inventors: Shiue-Ru Wu, Hsinchu (TW); Ching-Tung Wu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 249 days.

(21) Appl. No.: 17/510,414

(22) Filed: Oct. 26, 2021

(65) Prior Publication Data
US 2022/0221994 A1 Jul. 14, 2022

(30) Foreign Application Priority Data
Jan. 8, 2021 (TW) ................................ 110100872

(51) Int. Cl.
*G06F 3/06* (2006.01)

(52) U.S. Cl.
CPC .......... *G06F 3/0623* (2013.01); *G06F 3/0655* (2013.01); *G06F 3/0679* (2013.01)

(58) Field of Classification Search
CPC .... G06F 3/0623; G06F 3/0655; G06F 3/0679; G06F 3/0638; G06F 21/79
See application file for complete search history.

(56) References Cited

U.S. PATENT DOCUMENTS

| | | | |
|---|---|---|---|
| 8,726,040 B2 | 5/2014 | Dolgunov et al. | |
| 2016/0139827 A1 | 5/2016 | Lee et al. | |
| 2018/0067872 A1* | 3/2018 | Goulahsen | G06F 12/1408 |

(Continued)

FOREIGN PATENT DOCUMENTS

TW 515948 B 1/2003

OTHER PUBLICATIONS

OA letter of the counterpart TW application (appl. no. 110100872) mailed on Feb. 17, 2022. Summary of the OA letter: (1) Claims 1~10 are rejected as being unpatentable over the disclosure of the cited reference 1 (TW515948B). Correspondence bewteen claims of TW counterpart application and claims of US application: (1). Claims 1~10 in TW counterpart application correspond to claims 1~10 in US application, respectively.

*Primary Examiner* — Charles Rones
*Assistant Examiner* — Jonah C Krieger
(74) *Attorney, Agent, or Firm* — WPAT, PC

(57) ABSTRACT

The present invention discloses a memory access apparatus having address scrambling mechanism that includes an address scrambling circuit and a memory controller. The address scrambling circuit performs the steps outlined below. An original access address is received to be interpreted into original unit indexes and a minimal original unit according to regional unit levels of a memory. Scrambled unit indexes and a minimal scrambled unit are generated correspondingly according to a random address generation algorithm, to further generate a scrambled access address accordingly, in which when a plurality of different original access addresses have at least one the same original unit indexes from the highest block unit level, the scrambled unit indexes generated therefrom are the same. The memory controller accesses the memory according to the scrambled access address.

18 Claims, 5 Drawing Sheets

(56) References Cited

U.S. PATENT DOCUMENTS

2020/0233815 A1\* 7/2020 Peeters ............... G06F 12/1408
2021/0049309 A1\* 2/2021 Su ........................... G06F 3/062
2022/0215874 A1\* 7/2022 Lee ................... H03M 13/3933

\* cited by examiner

MEMORY ACCESS APPARATUS AND METHOD HAVING ADDRESS SCRAMBLING MECHANISM

BACKGROUND OF THE INVENTION

1. Field of the Invention

The present invention relates to a memory access apparatus and a memory access method having address scrambling mechanism.

2. Description of Related Art

Scrambling memory contents and address is a common method to protect the memory content from being hacked. However, the scrambling method that can be applied to the random access memory (RAM) and the read only memory (ROM) can not applied to the flash memory of serial interface due to the operation characteristic thereof. If a conventional memory scrambling method is used, the flash memory of serial interface may suffer from low efficiency of data transmission and difficult data maintenance.

SUMMARY OF THE INVENTION

In consideration of the problem of the prior art, an object of the present invention is to supply a memory access apparatus and a memory access method having address scrambling mechanism.

The present invention discloses a memory access apparatus having address scrambling mechanism that includes an address scrambling circuit and a memory controller. The address scrambling circuit is configured to receive an original access address to interpret the original access address into a plurality of original unit indexes and a minimal original unit according to a plurality of regional unit levels of a memory, and generate a plurality of scrambled unit indexes and a minimal scrambled unit according to a random address generation algorithm, to further generate a scrambled access address according to the scrambled unit indexes and the minimal scrambled unit, wherein when at least one of the original unit indexes from a highest one of the regional unit levels of any different two of the original access addresses are the same, the scrambled unit indexes generated from the same original unit indexes are the same. The memory controller is configured to access the memory according to the scrambled access address.

The present invention also discloses a memory access method having an address scrambling mechanism used in a memory access apparatus that includes the steps outlined below. An original access address is received by an address scrambling circuit to interpret the original access address into a plurality of original unit indexes and a minimal original unit according to a plurality of regional unit levels of a memory. A plurality of scrambled unit indexes and a minimal scrambled unit are generated according to a random address generation algorithm by the address scrambling circuit, to further generate a scrambled access address according to the scrambled unit indexes and the minimal scrambled unit, wherein when at least one of the original unit indexes from a highest one of the regional unit levels of any different two of the original access addresses are the same, the scrambled unit indexes generated from the same original unit indexes are the same. The memory is accessed according to the scrambled access address by a memory controller.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a memory access apparatus and a memory access method having address scrambling mechanism to scramble the physical memory under the condition that the address continuity of the logic memory is kept, such that both the objects of address scrambling and continuous memory operation can be accomplished.

Figure 1:
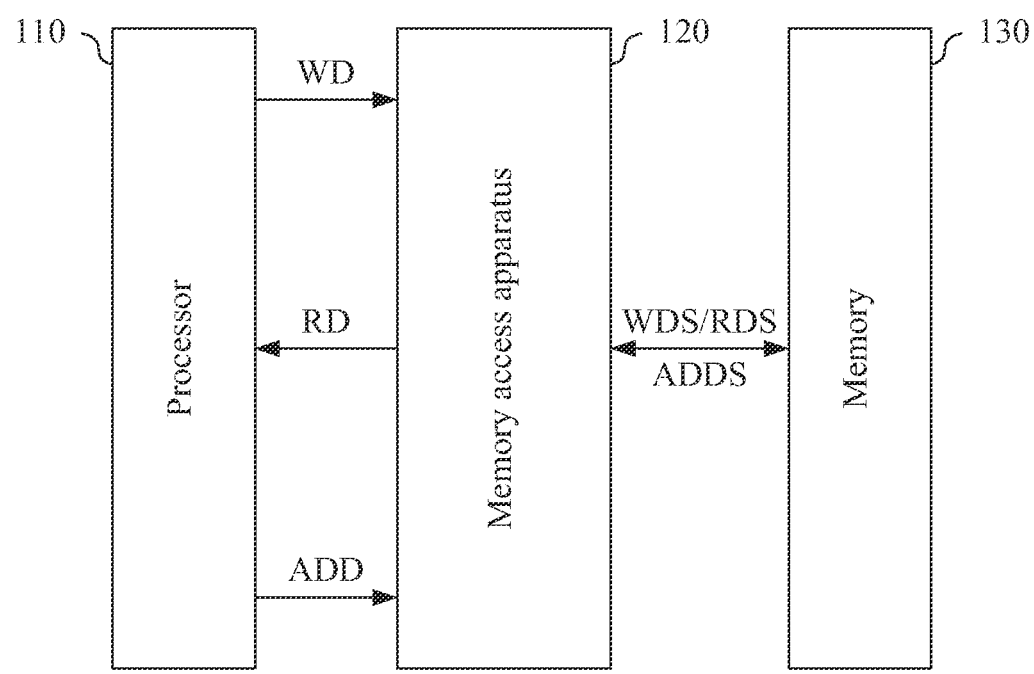
FIG. 1 illustrates a block diagram of a computer system according to an embodiment of the present invention.

Reference is now made to FIG. 1. FIG. 1 illustrates a block diagram of a computer system 100 according to an embodiment of the present invention. The computer system 100 includes a processor 110, a memory access apparatus 120 and a memory 130.

In an embodiment, a bus (not illustrated in the figure) is presented among the processor 110, the memory access apparatus 120 and the memory 130 such that these components perform data and command transmission with each other through the bus. In operation, the processor 110 generates commands such that the memory access apparatus 120 processes the commands and accesses the memory 130 accordingly. In an embodiment, the memory 130 can be such as, but not limited to a serial peripheral interface (SPI) flash memory.

When a memory access operation is a write operation, the processor 110 transmits write data WD and an original access address ADD corresponding to a target of data-writing to the memory access apparatus 120 to be processed. The memory access apparatus 120 scrambles the original access address ADD to generate a scrambled access address ADDS and selectively scrambles the write data WD to generate scrambled write data WDS. Further, the memory access apparatus 120 writes the scrambled write data WDS to the memory 130 to be stored therein according to the scrambled access address ADDS.

When a memory access operation is a read operation, the processor 110 transmits the original access address ADD corresponding to a target for data-reading to the memory access apparatus 120 to be processed. The memory access apparatus 120 scrambles the original access address ADD to generate scrambled access address ADDS and reads scrambled read data RDS from the memory 130 accordingly. Further, the memory access apparatus 120 unscrambles the scrambled read data RDS to generate read data RD and transmits the read data RD to the processor 110.

As a result, during the operation performed by the memory access apparatus 120 described above, the original access address ADD serves as a logic access address for the reference of the processor 110. The scrambled access address ADDS serves as the physical access address of the memory 130. The original access address ADD and the scrambled access address ADDS are mapped with each other according to the address scrambling mechanism of the memory access apparatus 120.

Figure 2:
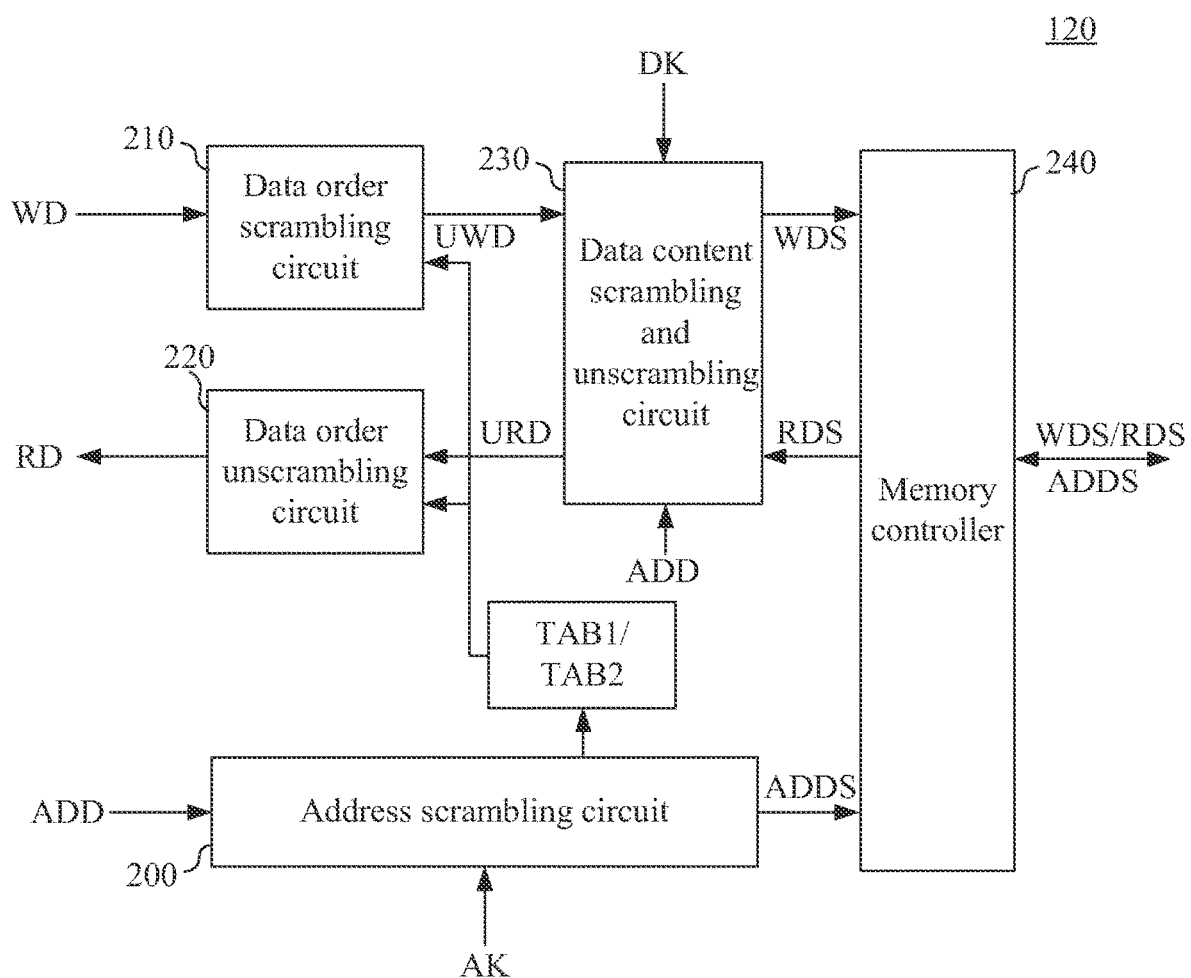
FIG. 2 illustrates a detailed block diagram of the memory access apparatus having address scrambling mechanism according to an embodiment of the present invention.

Reference is now made to FIG. 2. FIG. 2 illustrates a more detailed block diagram of the memory access apparatus 120 having address scrambling mechanism according to an embodiment of the present invention. The memory access apparatus 120 includes an address scrambling circuit 200, a data order scrambling circuit 210, a data order unscrambling circuit 220, a data content scrambling and unscrambling circuit 230 and a memory controller 240.

The address scrambling circuit 200 receives the original access address ADD from the processor 110 in FIG. 1 to scramble the original access address ADD and generate a scrambled access address ADDS.

Figure 3:
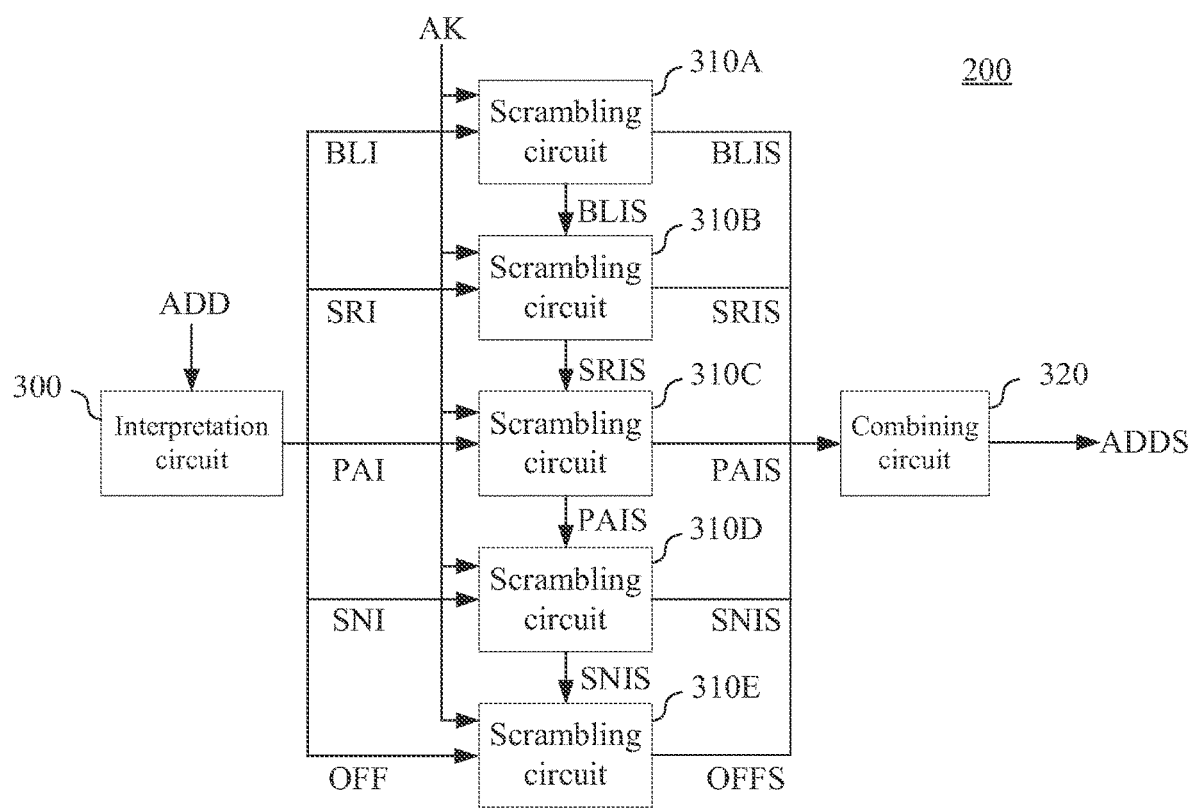
FIG. 3 illustrates a detailed block diagram of the address scrambling circuit according to an embodiment of the present invention.

Reference is now made to FIG. 3. FIG. 3 illustrates a detailed block diagram of the address scrambling circuit 200 according to an embodiment of the present invention. In an embodiment, the address scrambling circuit 200 includes an interpretation circuit 300, a plurality of scrambling circuits 310A-310E and a combining circuit 320.

The interpretation circuit 300 receives and interprets the original access address ADD into a plurality of original unit indexes and a minimal original unit according to a plurality of regional unit levels of the memory 130.

In an embodiment, the regional unit levels of the memory 130, from a highest level to a lowest level, includes a block level, a sector level a page level, a section level and an offset level. Corresponding to the levels described above, the original unit indexes include an original block level index BLI, an original sector level index SRI, an original page level index PAI and an original section level index SNI. The minimal original unit corresponds to the offset level and is an original offset OFF.

For example, in a numerical example, a size of a unit of the block level of the memory 130 is 64 kbyte (KB). A size of a unit of the sector level is 4 kbyte. A size of a unit of the page level is 256 byte. A size of a unit of the section level is 32 byte. A size of a unit of the offset level is 1 byte. Under such a condition, when the original access address ADD in the form of hexadecimal number is 0x28344, the original block level index BLI is 2, the original sector level index SRI is 8, the original page level index PAI is 3, the original section level index SNI is 4 and the original offset OFF is 4 in the interpreted result generated by the interpretation circuit 300.

It is appreciated that in a practical implementation, the size of the unit of each of the block levels of the memory 130 can be different based on the total size of the memory 130. The present invention is not limited thereto.

The scrambling circuits 310A-310E respectively scramble one of the original unit indexes and the minimal original unit in turn according to the random address generation algorithm to generate one of the scrambled unit indexes and the minimal scrambled unit. The scrambled unit indexes also correspond to the levels described above and include a scrambled block level index BLIS, a scrambled sector level index SRIS, a scrambled page level index PAIS and a scrambled section level index SNIS. The minimal scrambled unit corresponds to the offset level and is a scrambled offset OFFS.

More specifically, the scrambling circuits 310A-310E in turn receives the original block level index BLI, the original sector level index SRI, the original page level index PAI, the original section level index SN and the original offset OFF, to scramble each of the indexes to correspondingly generate the scrambled block level index BLIS, the scrambled sector level index SRIS, the scrambled page level index PAIS, the scrambled section level index SNIS and the scrambled offset OFFS.

In an embodiment, the random address generation algorithm of the scrambling circuits 310A-310E generates random numbers according to an address scrambling key AK. The scrambling circuits 310A-310E receive the scrambling key AK and generate the scrambled unit indexes according to an internal pseudo-random number generator (not illustrated in the figure). In an embodiment, each of the scrambled unit indexes does not exceed a maximal value of the original unit indexes.

In another embodiment, the random address generation algorithm generates random numbers according to a generated one of the scrambled unit indexes. The scrambling circuits 310A-310E feeds the generated one of the scrambled unit indexes to the next scrambling circuit as a seed for the internal pseudo-random number generator to generate the scrambled unit indexes. For example, the scrambling circuit 310A feeds the generated scrambled block level index BLIS to the scrambling circuit 310B, and the scrambling circuit 310B feeds the generated scrambled sector level index SRIS to the scrambling circuit 310B. Identically, the scrambling circuits 310C-310E is able to perform generation and feeding of the generated scrambled unit indexes. The detail is not described herein.

It is appreciated that the address scrambling may be performed based on the random address generation algorithm with the use of one of the seeds (scrambling based on a key or a feeding of a previous level index), both of the seeds, or the seeds described above combining with other seeds. The present invention is not limited thereto.

The combining circuit 320 combines the scrambled unit indexes and the minimal scrambled unit to generate the scrambled access address ADDS. Subsequently, the memory controller 240 in FIG. 2 accesses the memory 130 according to the scrambled access address ADDS.

In an embodiment, when at least one of the original unit indexes from a highest one of the regional unit levels corresponding to any different two of the original access addresses ADD are identical, the scrambled unit indexes of the scrambled access address ADDS generated from the same original unit index are identical.

Figure 4:
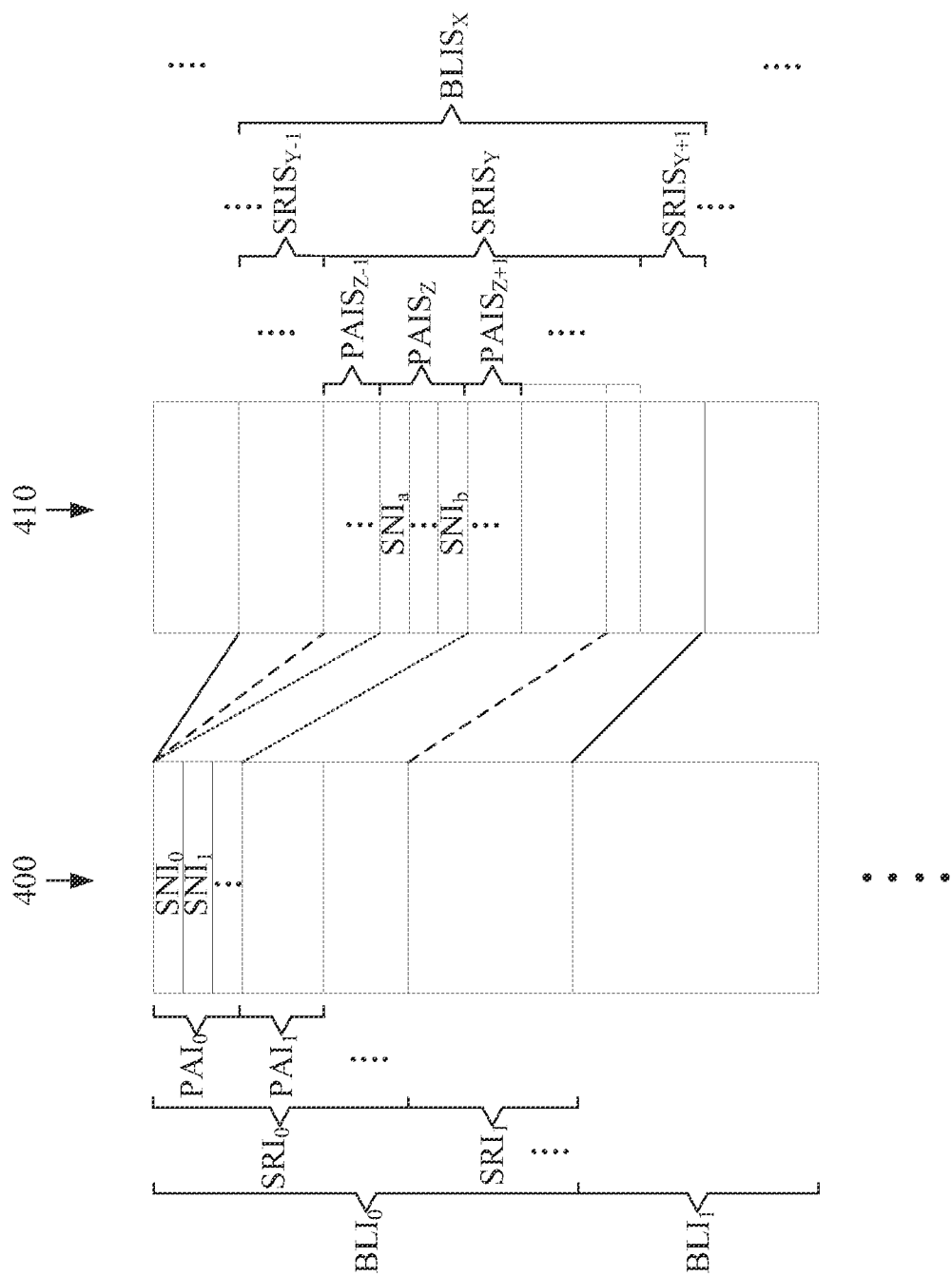
FIG. 4 illustrates a diagram of a logic memory that uses the original access address as reference and a physical memory that uses the scrambled access address as reference according to an embodiment of the present invention.

Reference is now made to FIG. 4. FIG. 4 illustrates a diagram of a logic memory 400 that uses the original access address ADD as reference and a physical memory 410 that uses the scrambled access address ADDS as reference according to an embodiment of the present invention.

The logic memory 400 includes a plurality blocks each corresponding to an original block level index BLI. Each of the blocks includes a plurality of sectors each corresponding to an original sector level index SRI. Each of the sectors includes a plurality of pages each corresponding to an original page level index PAI. Each of the pages includes a plurality of sections each corresponding to an original section level index SNI.

In FIG. 4, the blocks $BLI_0$ and $BLI_1$ corresponding to the original block level indexes BLI of 0 and 1, the sectors $SRI_0$ and $SRI_1$ in the block $BLI_0$ corresponding to the original sector level indexes SRI of 0 and 1, the pages $PAI_0$ and $PAI_1$ in the sector $SRI_0$ corresponding to the original page level indexes PAI of 0 and 1, and the sections $SNI_0$ and $SNI_1$ in the page $PAI_0$ corresponding to the original section level indexes SNI of 0 and 1 are exemplarily illustrated.

The physical memory 410 has an identical configuration. However, the block $BLI_0$ of the logic memory 400 corresponds to the block $BLIS_X$ of the physical memory 410 after scrambling. More specifically, once the value of the original block level index BLI is 0 in the original access address ADD, the value of the scrambled block level index BLIS is X in the scrambled access address ADDS generated after scrambling.

Identically, the sector $SRI_0$ in the block $BLI_0$ of the logic memory 400 corresponds to the sector $SRIS_Y$ in the block $BLIS_X$ of the physical memory 410. More specifically, once the value of the original block level index BLI is 0 and the value of the original sector level index SRI is 0 in the original access address ADD, the value of the scrambled block level index BLIS is X and the value of the scrambled sector level index SRIS is Y in the scrambled access address ADDS generated after scrambling.

The page $PAI_0$ in the sector $SRI_0$ in the block $BLI_0$ of the logic memory 400 corresponds to the page $PAIS_Z$ in the sector $SRIS_Y$ in the block $BLS_X$ of the physical memory 410. More specifically, once the value of the original block level index BLI is 0, the value of the original sector level index SRI is 0 and the value of the original page level index PAI is 0 in the original access address ADD, the value of the scrambled block level index BLIS is X, the value of the scrambled sector level index SRIS is Y and the value of the scrambled page level index PAIS is Z in the scrambled access address ADDS generated after scrambling.

Similarly, the section $SNI_0$ and the section SNI1 in the page $PAI_0$ in the sector $SRI_0$ in the block $BLI_0$ of the logic memory 400 correspond to the section SNISa and the section SNISb in the page $PAIS_Z$ in the sector $SRIS_Y$ in the block $BLS_X$ of the physical memory 410. The detail is not further described herein.

The address scrambling mechanism described above is able to keep the continuity of the larger and continuous memory region in the memory 130. More specifically, each of the memory regions in the physical memory 410 still corresponds to each of the memory regions in the logic memory 400, as illustrated in FIG. 4.

After the address scrambling circuit 200 generates the scrambled access address ADDS, the data order scrambling circuit 210, the data order unscrambling circuit 220 and the data content scrambling and unscrambling circuit 230 in FIG. 2 perform scrambling of the data order and data content. The operation of these components is further described in detail in the following paragraphs.

In an embodiment, the processor 110 performs write operation on the memory 130 on a section level or a page level.

When the write operation is performed on the section level, the size of the unit of the offset level, which is a level lower than section level, corresponds to the minimal memory regional unit. The data order scrambling circuit 210 is thus bypassed such that the write data WD serves as the under-written data UWD.

Further, the data content scrambling and unscrambling circuit 230 generates the scrambled write data WDS from the under-written data UWD according to a random data generation algorithm. The memory controller 240 writes the scrambled write data WDS to the memory 130 to be stored according to the scrambled access address ADDS. In an embodiment, the random data generation algorithm used by the data content scrambling and unscrambling circuit 230 generates the random number according to a data scrambling key DK and/or the original access address ADD.

In order to accomplish the object of data order scrambling, under the condition that the original access address ADD of the write operation corresponds to the page level, the address scrambling circuit 200 generates a scrambling order table TAB1 and a scrambling order table TAB2 according to the original access address ADD. More specifically, in an embodiment, the scrambling order table TAB1 corresponds to the section level and is generated according to the address scrambling key AK and the scrambled page level index PAIS. The scrambling order table TAB2 corresponds to the offset level and is generated according to the address scrambling key AK and the scrambled section level index SNIS.

The scrambling order table TAB1 records address-scrambling arrangement order of the address of the original section level index SNI in a page. As a result, the original section level index SNI can be converted to the scrambled section level index SNIS according to the scrambling order table TAB1. On the other hand, the scrambling order table TAB2 records address-scrambling arrangement order of the address of the original offset OFF in a section. As a result, the original offset OFF can be converted to the scrambled offset OFFS according to the scrambling order table TAB2.

On the contrary, the indexes of the other levels, e.g., the original block level index BLI, the original sector level index SRI and the original page level index PAI are converted to the scrambled block level index BLIS, the scrambled sector level index SRIS and the scrambled page level index PAIS directly by the scrambling circuits 310A, 310B and 310C.

As a result, the data order scrambling circuit 210 performs data order scrambling on write data WD according to the scrambling order table TAB1 and the scrambling order table TAB2 to generate and transmit the under-written data UWD to the data content scrambling and unscrambling circuit 230 to further perform subsequent data content scrambling.

In an embodiment, the scrambling order table TAB1 and the scrambling order table TAB2 can be stored in a register (not illustrated in the figure) of the memory access apparatus 120 to be accessed by the data order scrambling circuit 210. Further, the data order scrambling circuit 210 may also include a cache memory (or register) to store the write data WD and an operation circuit to process the write data WD.

Similarly, the processor 110 is able to perform read operation on the memory 130 on the section level or the page level.

At first, the data content scrambling and unscrambling circuit 230 reads the scrambled read data RDS from the memory 130 through the memory controller 240 and performs unscrambling thereon to generate under-read data URD according to the random data generation algorithm.

When the read operation is performed on the section level, the size of the unit of the offset level, which is a level lower than section level, corresponds to the minimal memory regional unit. The data order unscrambling circuit 220 is thus bypassed such that under-read data URD serves as the read data RD.

In order to accomplish the object of data order unscrambling, under the condition that the original access address ADD of the read operation corresponds to the page level, the address scrambling circuit 200 generates the scrambling order table TAB1 and the scrambling order table TAB2 according to the original access address ADD. More specifically, in an embodiment, the scrambling order table TAB1 corresponds to the section level and is generated according to the address scrambling key AK and the scrambled page level index PAIS. The scrambling order table TAB2 corresponds to the offset level and is generated according to the address scrambling key AK and the scrambled section level index SNIS. The meaning of the scrambling order table TAB1 and the scrambling order table TAB2 is already described in previous paragraphs and is not described herein.

As a result, the data order unscrambling circuit 220 performs data order unscrambling on the under-read data URD according to the scrambling order table TAB1 and the scrambling order table TAB2 to generate and transmit the read data RD to the processor 110.

Similarly, in an embodiment, the scrambling order table TAB1 and the scrambling order table TAB2 can be stored in a register of the memory access apparatus 120 to be accessed by the data order unscrambling circuit 220. Further, the data order unscrambling circuit 220 may also include a cache memory (or register) to store the under-read data URD and an operation circuit to process the under-read data URD.

In an embodiment, besides the write operation and the read operation, the access performed on the memory 130 further includes erase operation. More specifically, the memory controller 240 performs erase operation on a memory area of the memory 130 according to the scrambled access address ADDS generated by the address scrambling circuit 200. For the processor 110, the operation performed on the physical memory 130 according to scrambled access address ADDS can keep the continuity of the logic memory such that the operation can be performed on a larger and continuous memory region. As a result, the erase operation can be performed on a larger region, such as but not limited to a sector, of the memory 130.

In some approaches, the address scrambling mechanism is performed in a total random method. However, the scrambled physical memory is not able to keep the original continuity of the logic memory such that the operation is unable to be performed on a larger and continuous memory region of the memory 130.

By using the address scrambling mechanism of the present invention, the physical memory can keep the address continuity of the logic memory address. As a result, the processor 110 in FIG. 1 can perform operation, e.g., read, burn, erase or lock, on the areas of a higher region unit level (e.g., block, sector or page) and accomplish both of the objects of address-scrambling and continuous memory operation.

Figure 5:
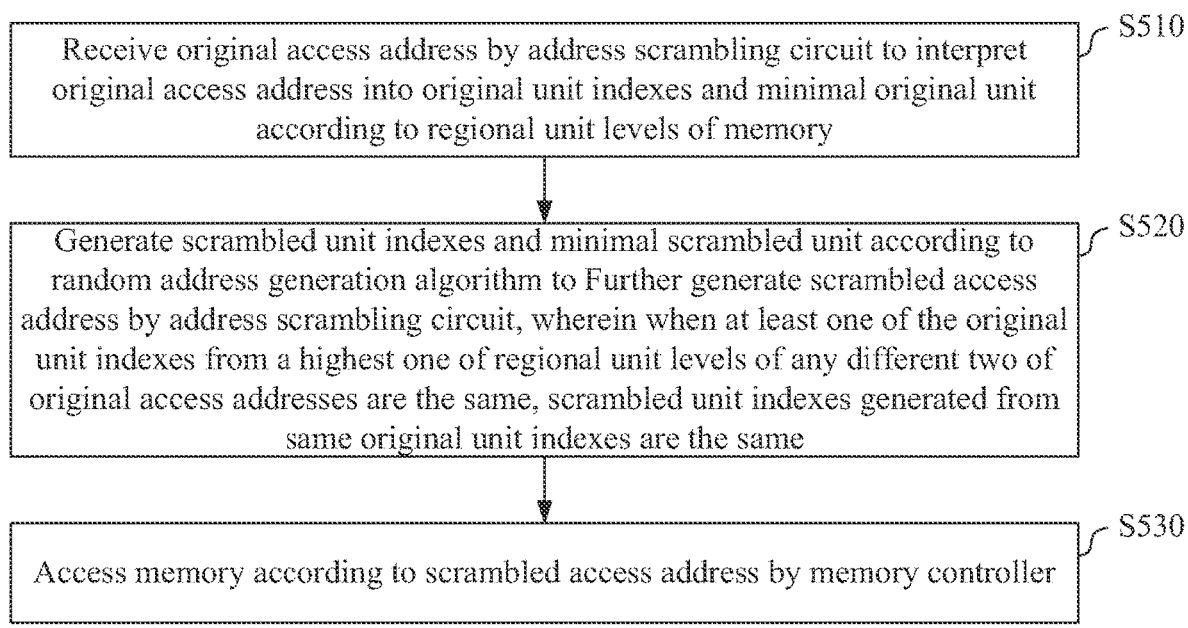
FIG. 5 illustrates a flow chart of a memory access method according to an embodiment of the present invention.

Reference is now made to FIG. 5. FIG. 5 illustrates a flow chart of a memory access method 500 according to an embodiment of the present invention.

In addition to the apparatus described above, the present disclosure further provides the memory access method 500 that can be used in such as, but not limited to, the memory access apparatus 120 in FIG. 1. As illustrated in FIG. 5, an embodiment of the memory access method 500 includes the following steps.

In step S510, the original access address ADD is received by the address scrambling circuit 200 to interpret the original access address ADD into the original unit indexes and the minimal original unit according to the regional unit levels of the memory 130, e.g., the original block level index BLI, the original sector level index SRI, the original page level index PAI, the original section level index SNI and the original offset OFF illustrated in FIG. 3.

In step S520, the scrambled unit indexes and the minimal scrambled unit are generated according to the random address generation algorithm by the address scrambling circuit 200, e.g., the scrambled block level index BLIS, the scrambled sector level index SRIS, the scrambled page level index PAIS, the scrambled section level index SNIS and the scrambled offset OFFS. The address scrambling circuit 200 further generates the scrambled access address ADDS according to the scrambled unit indexes and the minimal scrambled unit, wherein when at least one of the original unit indexes from a highest one of the regional unit levels of any different two of the original access addresses ADD are the same, the scrambled unit indexes generated from the same original unit indexes are the same.

In step S530, the memory 130 is accessed according to the scrambled access address ADDS by the memory controller 240.

It is appreciated that the embodiments described above are merely an example. In other embodiments, it should be appreciated that many modifications and changes may be made by those of ordinary skill in the art without departing from the spirit of the disclosure.

In summary, the memory access apparatus and the memory access method having address scrambling mechanism scrambles the physical memory under the condition that the address continuity of the logic memory is kept, such that both the objects of address scrambling and continuous memory operation can be accomplished.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A memory access apparatus having an address scrambling mechanism, comprising:
   an address scrambling circuit configured to:
   receive an original access address to interpret the original access address into a plurality of original unit indexes and a minimal original unit according to a plurality of regional unit levels of a memory; and
   generate a plurality of scrambled unit indexes and a minimal scrambled unit according to a random address generation algorithm, to further generate a scrambled access address according to the scrambled unit indexes and the minimal scrambled unit, wherein when at least one of the original unit indexes from a highest one of the regional unit levels of any different two of the original access addresses are the same, the scrambled unit indexes generated from the same original unit indexes are the same; and
   a memory controller configured to access the memory according to the scrambled access address.

2. The memory access apparatus of claim 1, wherein the regional unit levels, from a highest level to a lowest level, comprises a block level, a sector level, a page level, a section level and an offset level;
   wherein the original unit indexes and the scrambled unit indexes respectively correspond to the block level, the sector level, the page level, the section level and the offset level, and the minimal original unit and the minimal scrambled unit correspond to the offset level.

3. The memory access apparatus of claim 1, wherein the address scrambling circuit comprises:
   an interpretation circuit configured to receive and interpret the original access address into the original unit indexes and the minimal original unit;
   a plurality of scrambling circuits respectively configured to scramble one of the original unit indexes and the minimal original unit according to the random address generation algorithm to generate one of the scrambled unit indexes and the minimal scrambled unit; and
   a combining circuit configured to combine the scrambled unit indexes and the minimal scrambled unit to generate the scrambled access address.

4. The memory access apparatus of claim 3, wherein the random address generation algorithm generates random numbers according to an address scrambling key and/or a generated one of the scrambled unit indexes.

5. The memory access apparatus of claim 1, further comprising:
   a data content scrambling and unscrambling circuit configured to:
      generate scrambled write data from under-written data according to a random data generation algorithm when a write operation is performed such that the memory controller writes the scrambled write data to the memory; and
      read scrambled read data from the memory by the memory controller when a read operation is performed such that the data content scrambling and unscrambling circuit performs unscrambling thereon to generate under-read data according to the random data generation algorithm.

6. The memory access apparatus of claim 5, wherein the address scrambling circuit is further configured to generate two scrambling order tables according to the scrambled access address under the condition that the write operation and the read operation are performed on a page level of the regional unit levels, in which the two scrambling order tables record address-scrambling arrangement orders of the address-scrambling performed by the address scrambling circuit that respectively correspond to a section level and an offset level of the regional unit levels, the memory access apparatus further comprises:
   a data order scrambling circuit configured to perform data order scrambling on write data according to the two scrambling order tables to generate and transmit the under-written data to the data content scrambling and unscrambling circuit; and
   a data order unscrambling circuit configured to perform data order unscrambling on the under-read data according to the two scrambling order tables to generate read data.

7. The memory access apparatus of claim 6, wherein the data order scrambling circuit is bypassed such that the write data serves as the under-written data and the data order unscrambling circuit is bypassed such that the under-read data serves as the read data when the write operation and the read operation are performed corresponding to the section level of the regional unit levels.

8. The memory access apparatus of claim 1, wherein the memory controller is further configured to erase a memory area of the memory according to the scrambled access address.

9. The memory access apparatus of claim 1, wherein the memory is a serial peripheral interface (SPI) flash memory.

10. A memory access method having an address scrambling mechanism used in a memory access apparatus, comprising:
    receiving an original access address by an address scrambling circuit to interpret the original access address into a plurality of original unit indexes and a minimal original unit according to a plurality of regional unit levels of a memory;
    generating a plurality of scrambled unit indexes and a minimal scrambled unit according to a random address generation algorithm by the address scrambling circuit, to further generate a scrambled access address according to the scrambled unit indexes and the minimal scrambled unit, wherein when at least one of the original unit indexes from a highest one of the regional unit levels of any different two of the original access addresses are the same, the scrambled unit indexes generated from the same original unit indexes are the same; and
    accessing the memory according to the scrambled access address by a memory controller.

11. The memory access method of claim 10, wherein the regional unit levels, from a highest level to a lowest level, comprises a block level, a sector level, a page level, a section level and an offset level;
    wherein the original unit indexes and the scrambled unit indexes respectively correspond to the block level, the sector level, the page level, the section level and the offset level, and the minimal original unit and the minimal scrambled unit correspond to the offset level.

12. The memory access method of claim 10, further comprising:
    receiving and interpreting the original access address into the original unit indexes and the minimal original unit by an interpretation circuit of the address scrambling circuit;
    respectively scrambling one of the original unit indexes and the minimal original unit according to the random address generation algorithm to generate one of the scrambled unit indexes and the minimal scrambled unit by a plurality of scrambling circuits of the address scrambling circuit; and
    combining the scrambled unit indexes and the minimal scrambled unit to generate the scrambled access address by a combining circuit of the address scrambling circuit.

13. The memory access method of claim 12, further comprising:
    generating random numbers according to an address scrambling key and/or a generated one of the scrambled unit indexes by the random address generation algorithm.

14. The memory access method of claim 10, further comprising:
    generating scrambled write data from under-written data according to a random data generation algorithm by a data content scrambling and unscrambling circuit when a write operation is performed such that the memory controller writes the scrambled write data to the memory; and
    reading scrambled read data from the memory by the memory controller when a read operation is performed such that the data content scrambling and unscrambling circuit performs unscrambling thereon to generate under-read data according to the random data generation algorithm.

15. The memory access method of claim 14, further comprising:

generating two scrambling order tables according to the scrambled access address by the address scrambling circuit under the condition that the write operation and the read operation are performed on a page level of the regional unit levels, in which the two scrambling order tables record address-scrambling arrangement orders of the address-scrambling performed by the address scrambling circuit that respectively correspond to a section level and an offset level of the regional unit levels;

performing data order scrambling on write data according to the two scrambling order tables by a data order scrambling circuit to generate and transmit the under-written data to the data content scrambling and unscrambling circuit; and performing data order unscrambling on the under-read data according to the two scrambling order tables by a data order unscrambling circuit to generate read data.

16. The memory access method of claim 15, further comprising:

bypassing the data order scrambling circuit such that the write data serves as the under-written data and bypassing the data order unscrambling circuit such that the under-read data serves as the read data when the write operation and the read operation are performed corresponding to the section level of the regional unit levels.

17. The memory access method of claim 10, further comprising:

erasing a memory area of the memory according to the scrambled access address by the memory controller.

18. The memory access method of claim 10, wherein the memory is a serial flash memory.

* * * * *